United States Patent
Huang et al.

(10) Patent No.: US 6,904,224 B2
(45) Date of Patent: Jun. 7, 2005

(54) CYCLOOLEFIN COPOLYMERIC OPTICAL COMMUNICATION DEVICE

(75) Inventors: Chao-Tsai Huang, Taoyuan (TW); Hsi-Hsin Shih, Taichung (TW); Chien-Tsung Wu, Taichung (TW); Jung-Chieh Su, Hainchu (TW); Feng-Yu Yang, Taichung (TW); Joung-Yei Chen, Hsinchu (TW)

(73) Assignee: Industrial Technology Research Institute (TW)

( * ) Notice: Subject to any disclaimer, the term of this patent is extended or adjusted under 35 U.S.C. 154(b) by 112 days.

(21) Appl. No.: 10/642,264

(22) Filed: Aug. 18, 2003

(65) Prior Publication Data

US 2004/0179802 A1 Sep. 16, 2004

(30) Foreign Application Priority Data

Mar. 10, 2003 (TW) .................................... 92105086 A

(51) Int. Cl.$^7$ .................................................. G02B 6/00
(52) U.S. Cl. ....................... 385/143; 385/142; 385/144
(58) Field of Search ................................. 385/142, 143, 385/144

(56) References Cited

U.S. PATENT DOCUMENTS

| 6,214,951 | B1 | * | 4/2001 | Brekner et al. | ............. | 526/160 |
| 2003/0053770 | A1 | * | 3/2003 | Noddings et al. | ............. | 385/95 |
| 2003/0122480 | A1 | * | 7/2003 | Wei et al. | ................... | 313/506 |

* cited by examiner

*Primary Examiner*—John D. Lee
*Assistant Examiner*—James D. Stein
(74) *Attorney, Agent, or Firm*—Sughrue Mion, PLLC

(57) ABSTRACT

A cycloolefin in copolymeric (COC) optical communication device. The COC optical communication device includes a core section of functional metallocene cycloolefin copolymer (f-mCOC) having a refractive index $n_1$ for light transmission, and a cladding layer of metallocene cycloolefin copolymer (mCOC), having a refractive index $n_2$ smaller than $n_1$, surrounding the core section and forming a waveguide structure together with the core section. Due to the fact that the various components of the optical communication device are comprised of essentially the same materials, signal transmission loss between heterogeneous interfaces is prevented, and provides excellent optical properties and superior processability.

14 Claims, 4 Drawing Sheets

CYCLOOLEFIN COPOLYMERIC OPTICAL COMMUNICATION DEVICE

BACKGROUND OF THE INVENTION

1. Field of the Invention

The present invention relates to an optical communication device, and more particularly to a cycloolefin copolymeric (COC) optical communication device.

2. Description of the Related Art

As optical communication industry has progressed keen competition has arisen between companies. The selection of appropriate materials for device and module design has become a critical factor. Every potential material, for example has advantages and disadvantages. The conventional material, glass, has superior optical properties, but is brittle and as such is gradually being replaced by polymeric material. Polymeric materials have high impact strength and are easily molded by injection or extrusion molding, facilitate mass production, and offer reduced cost.

Polymeric materials applicable for optical communication devices feature the important properties of high transparency, low birefringence, low dispersion, high dimensional stability, superior mechanical properties, heat-resistance, and durability. Polymethylmethacrylate (PMMA), Polycarbonate (PC), and CR-39 resin are widely used as some commercial optical polymers have their respective advantages and disadvantages. PMMA has high transparency, low birefringence and is easily molded, but has poor heat and water resistance. PC has high transparency, high impact strength, and good heat resistance and is easily molded, but has high birefringence. CR-39 resin (mainly comprising diethylene glycol diallyl carbonate) is a thermal-setting resin able to bear temperatures greater than 100° C. after hardening. CR-39 has excellent hardness, and is suitable for grinding but not injection molding.

To meet the stringent requirements for optical communication devices, much effort has been made to develop a new-generation of polymeric materials, one such material is cycloolefin copolymer (COC). Typical COC materials are, for example, APEL (Mitsui Chemicals, Inc.), ARTON (JSR, Japan) and ZEONEX (Zeon, Japan).

Compared to other optical polymers such as PMMA, PC, or PS, COC is characterized by simplicity of material composition (mainly ethylene, mono-olefin, or poly-olefin), high-transparency, low water-absorption, and excellent physical and mechanical properties.

Though COC has great potential in the optical communication field, it is not yet widely applied. U.S. Pat. No. 5,637,400 discloses its application in an optical waveguide to ensure low transmission loss, but the waveguide is limited to an optical fiber.

Selection of materials for optical communication device is critical as unsuitable materials may have serious defects such as creating incompatible interfaces and the resulting signal-loss during transmission. For example, an incompatible interface may result between a core section and a cladding layer of a waveguide if they are made of different materials. The use of an appropriate material thus becomes critical in the manufacturing of an optical communication device.

SUMMARY OF THE INVENTION

Accordingly, an object of the present invention is to broaden the application scope of COC in the optical communication field, thereby developing all polymeric optical devices and ameliorating transmission loss resulting from incompatible interfaces.

Another object of the present invention is to provide a COC optical communication device having various parts made of essentially the same materials.

By systematically studying the refractive indices of COCs synthesized from different raw materials of different component ratios, the correlation therebetween is generalized, and a recipe system regarding the raw materials, the component ratios, and the refractive indices of the synthesized COCs is thus established, thereby facilitating mass production and fulfilling requirements of various specifications.

The invention provides a COC optical communication device, which comprises a core section of functional metallocene cycloolefin copolymer (f-mCOC) having a refractive index $n_1$ for light transmission, and a cladding layer of metallocene cycloolefin copolymer (mCOC), having a refractive index $n_2$ smaller than $n_1$, surrounding the core section and forming a waveguide structure together with the core section.

According to the invention, the functional metallocene cycloolefin copolymer can be synthesized from ethylene, norbornene, and a third monomer having an active site catalyzed by a metallocene catalyst. The third monomer having an active site can be 4-methyl-styrene, 5-ethyl-2-norbornene or 5-ethylidene-norbornene.

According to the invention, the refractive index $n_2$ of the cladding layer can be 1.5200–1.5400 while the refractive index $n_1$ of the core section is 1.5215–1.5631, depending on the requirements of a multi-mode device or a single-mode device.

According to the invention, the COC optical communication device can further comprise a U-groove and packaging mechanics, and the U-groove can be for passive alignment.

According to the invention, the COC optical communication device can be a multi-mode device, wherein the refractive-index difference between the core section and the cladding layer $\Delta n$ ($=n_1-n_2$) is 0.8%–1.5%, preferably 1.0%–1.2%.

According to the invention, the COC optical communication device can be a single-mode device, wherein the refractive-index difference between the core section and the cladding layer $\Delta n$ ($=n_1-n_2$) is 0.1%–0.84%, preferably 0.3%–0.35%.

According to the invention, the refractive indices $n_1$ and $n_2$ can be adjusted by altering the respective components of the core section and the cladding layer.

According to the inventive COC optical communication device, by forming an optical communication device with essentially the same materials, transmission loss via heterogeneous interfaces is avoided. In addition to the excellent optical properties and processability of COC materials, by altering the raw materials, component ratios and hardening conditions of the mCOC and f-mCOC for use as a cladding layer and core section respectively, the refractive indices $n_1$ and $n_2$ can be easily controlled to meet requirements for various specifications.

DESCRIPTION OF THE DRAWINGS

The present invention can be more fully understood by reading the subsequent detailed description and examples with references made to the accompanying drawings, wherein.

DETAILED DESCRIPTION OF THE INVENTION

Synthesis of COC

The COC optical communication device includes two main parts: the core section and the cladding layer. The cladding layer is made of mCOC, synthesized from ethylene and norbornene catalyzed by a metallocene catalyst, for example, or directly purchased, such as TOPAS 5013. The core section is made of f-mCOC, synthesized from ethylene, norbornene, and a third monomer having an active site catalyzed by a metallocene catalyst. The third monomer having an active site herein is 4-methyl-styrene. After the material mCOC for the cladding layer is determined, the material f-mCOC for the core section is then synthesized according to the required specification of the optical communication device, and forms a waveguide structure together with the cladding layer.

Manufacture of Optical Communication Device

Figure 1:
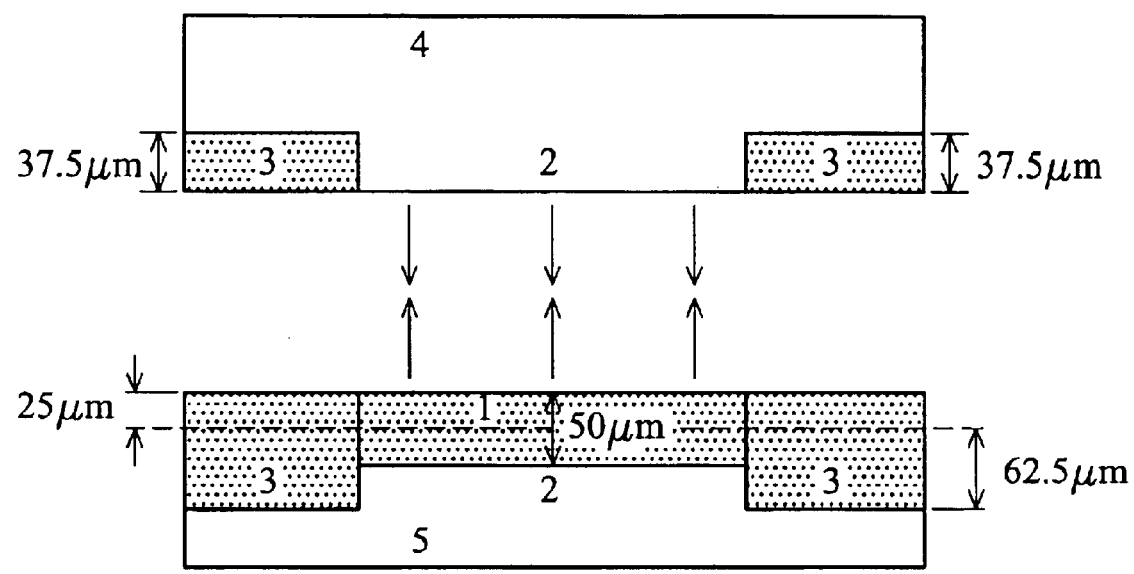
FIG. 1 illustrates the structure of a COC optical communication device.

As in FIG. 1, the optical communication device including a waveguide structure comprises a core section 1 of f-mCOC, a cladding layer 2 of mCOC, passive U-groove and packaging mechanics 3, an upper case 4 and a lower case 5, wherein the packaging mechanics is a micro-lens array. The dotted line shows the centerline of the waveguide. The core section 1 has a refractive index $n_1$ and the cladding layer 2 has a refractive index $n_2$. The refractive-index difference $\Delta n$ (=$n_1-n_2$) between the core section 1 and the cladding layer 2 is on demand. For example, for a multimode waveguide, the refractive-index difference $\Delta n$ is about 1.0%, while for a single-mode waveguide, the refractive-index difference $\Delta n$ is about 0.3%–0.5%.

In the embodiments, common manufacturing processes of optical communication devices, involving injection molding methods, applied to fabrication of optical communication devices, are described with reference to U.S. Pat. No. 5,311,604.

First, a metal cavity mold is manufactured by the excimer laser LIGA process. A mold based on the cavity mold is then fabricated by electroforming, including a cladding layer area 2, a passive U-groove area, and packaging mechanics area 3 which together form a waveguide structure. Then, mCOC is injected to the mold by a micro-injection molding system under predetermined conditions to form an upper case 4 and lower case 5 (i.e. the upper and lower cladding layer). Then, f-mCOC is filled in a core section area 1 of the waveguide structure by micro-casting employing optical microscopy and a high-precision dispensing system. Next, the upper case 4 and lower case 5 are joined with sealant, according to demands, such as OA61 or OA68 applied in the packaging mechanics or on the contact faces of the upper case 4 and lower case 5.

First Embodiment

Figure 2:
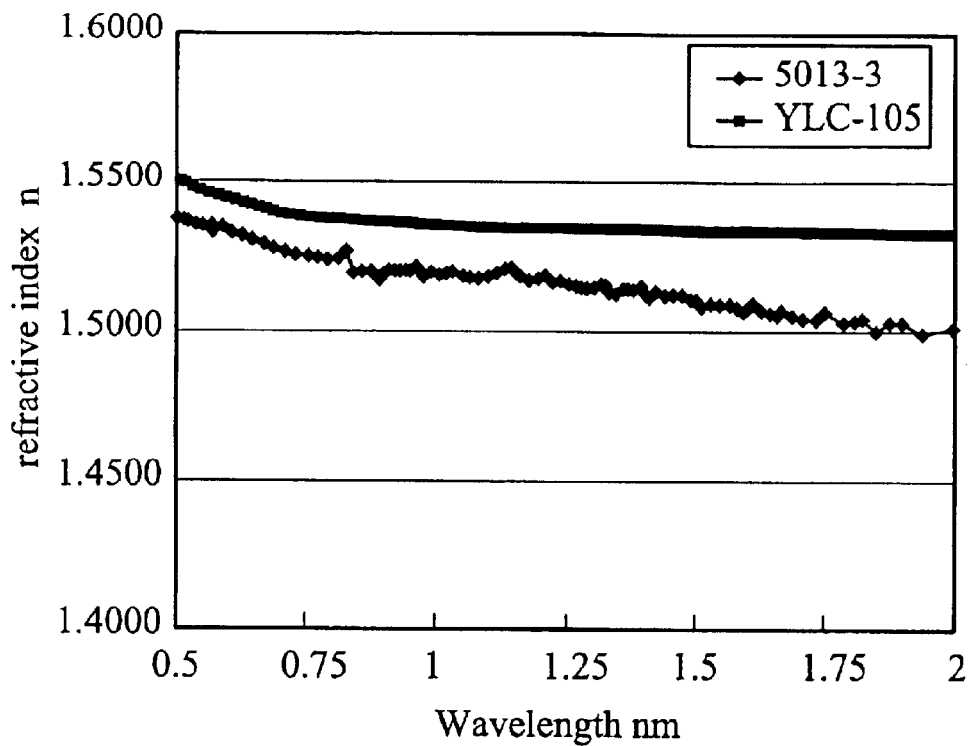
FIG. 2 shows the relationship between the refractive index and wavelength in the first embodiment.

First, mCOC and f-mCOC are synthesized according to the methods described above. FIG. 2 shows the relationship between wavelength and the refractive indices of mCOC and f-mCOC. Table 1 is generalized from the results shown in FIG. 2, showing the refractive index difference $\Delta n$ between f-mCOC (core section) and mCOC (cladding layer) at a certain wavelength. Table 2 shows the raw materials and their proportions to various f-mCOC samples.

TABLE 1

| wavelength | $n_2$ | $n_1$ | $\Delta n$ |
| --- | --- | --- | --- |
| 632.8 | 1.5310 | 1.5430 | 0.0120 |
| 866.0 | 1.5202 | 1.5376 | 0.0174 |
| 1310 | 1.5150 | 1.5344 | 0.0194 |
| 1550 | 1.5082 | 1.5338 | 0.0256 |

TABLE 2

| Sample | Ethylene | Norborene | PMS (4-methyl-styrene) |
| --- | --- | --- | --- |
| YLC-099 | 26.5 | 73.0 | 0.5 |
| YLC-087 | 26.1 | 71.4 | 2.5 |
| YLC-116 | 24.8 | 70.3 | 2.5 |
| YLC-105 | 28.9 | 55.6 | 15.5 |

Figure 3:
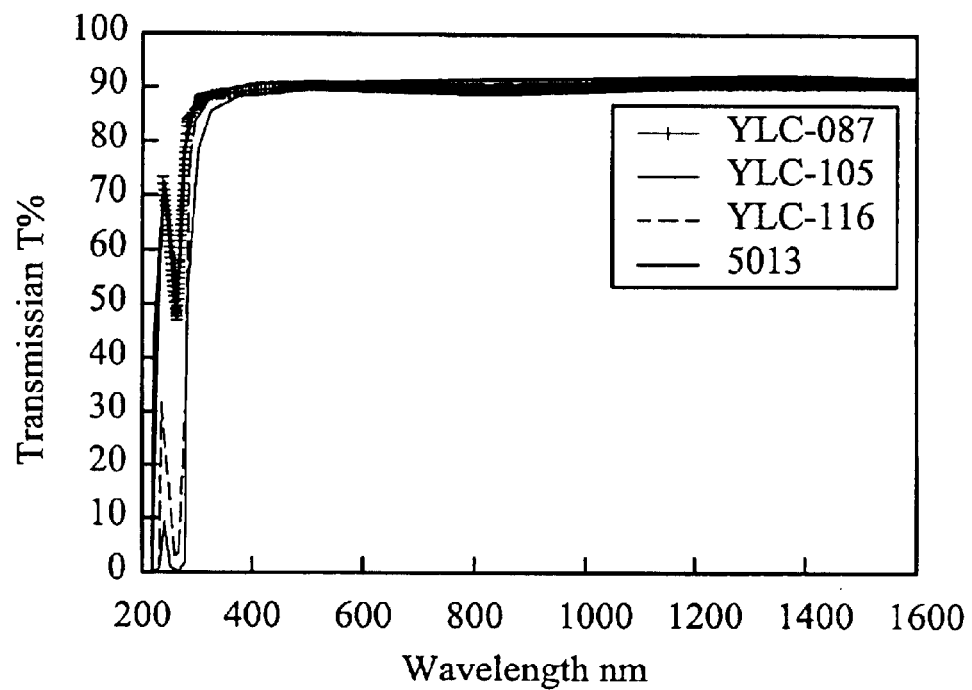
FIG. 3 shows the UV-Vis-IR spectrum in the first embodiment.

FIG. 3 shows the UV-Vis-IR spectrum of mCOC and f-mCOC, wherein the transmission of different materials at various wavelength is illustrated. It is obvious that the transmission of both f-mCOC (core section) and mCOC (cladding layer) at the wavelength ranging from 400–1600 $\mu$m is higher than 90%, and is suitable for use in optical communication devices.

Second Embodiment

Figure 4:
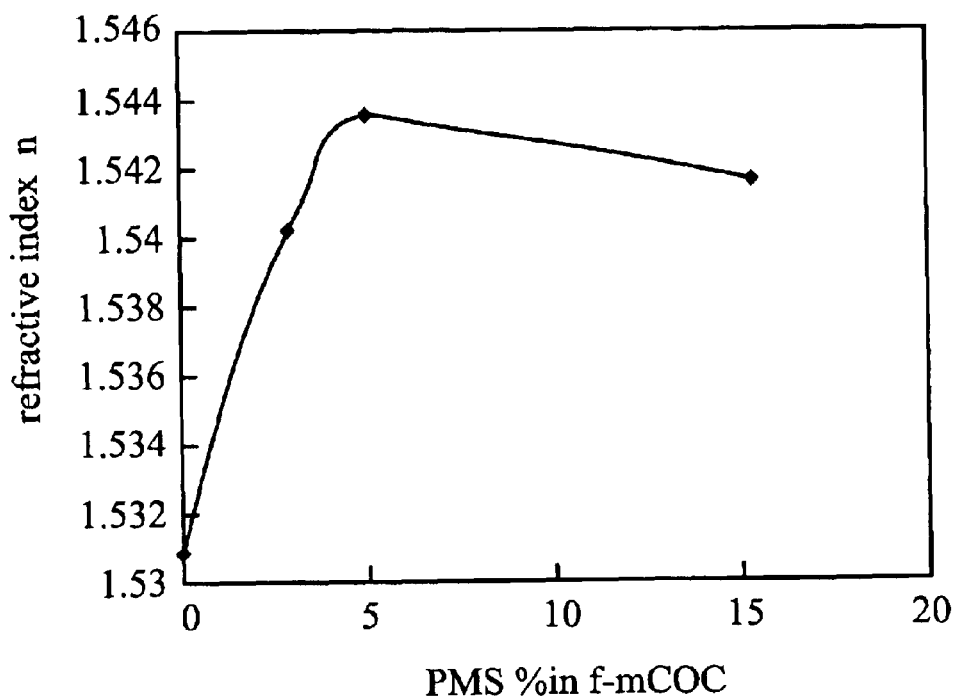
FIG. 4 shows alteration of the refractive-index by controlling the recipe of the raw materials in the second embodiment.

The core section is made of f-mCOC synthesized from ethylene, norbornene, and a third monomer having an active site under a specific metallocene catalyst. By altering the component ratios of ethylene, norbornene and the third monomer, various f-mCOC of various refractive indices are synthesized. When manufacturing an optical communication device, generally the cladding layer material is chosen first, i.e. the refractive index of the cladding layer $n_2$ is determined. Thus, according to the requirement $\Delta n$ of the optical communication device, the refractive index of the core section $n_1$ is then determined. The component ratios of ethylene, norbornene and the third monomer are then decided according to the predetermined refractive index and an appropriate material for the core section is chosen. For example, as shown in FIG. 4, when the cladding layer is made of mCOC with a refractive index of 1.5310 (at 632.8 nm), the material of the core section can be synthesized by altering the component ratios of ethylene, norbornene, and the third monomer to meet the required refractive index.

Third Embodiment

The core section can also be made of f-mCOC synthesized from photo-curable materials. In the embodiment, epoxy-hexyl-norbornane (EHN)/bisphenol diglycidyl ether (BADE) are applied in various proportions to synthesize f-mCOC of various refractive indices.

Figure 5:
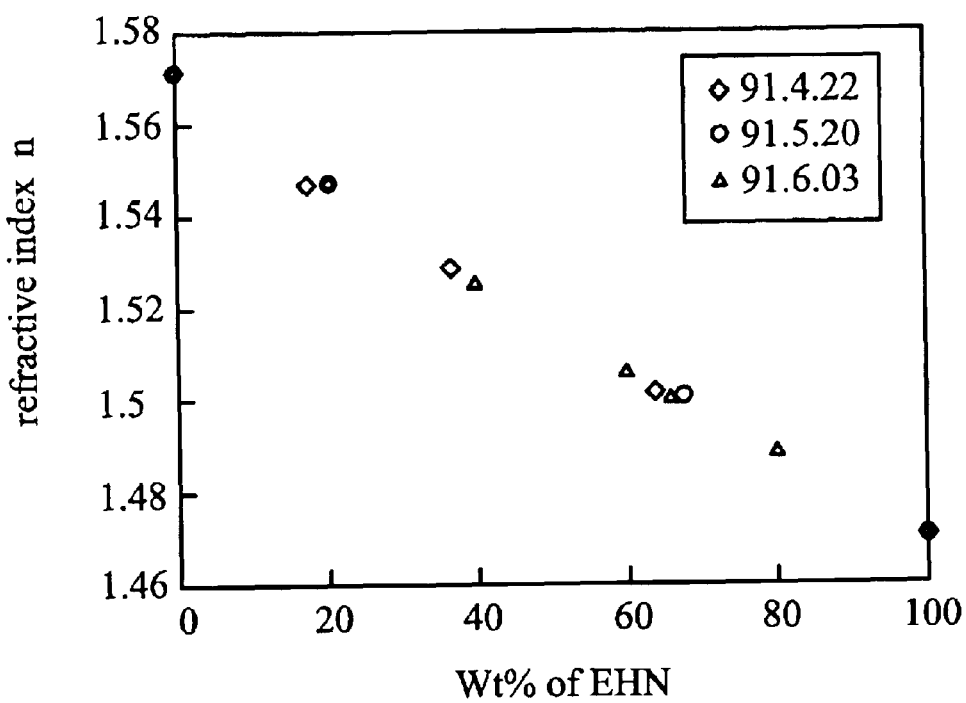
FIG. 5 shows the relationship between the refractive index of f-mCOC and the component proportion of EHN.
Figure 6:
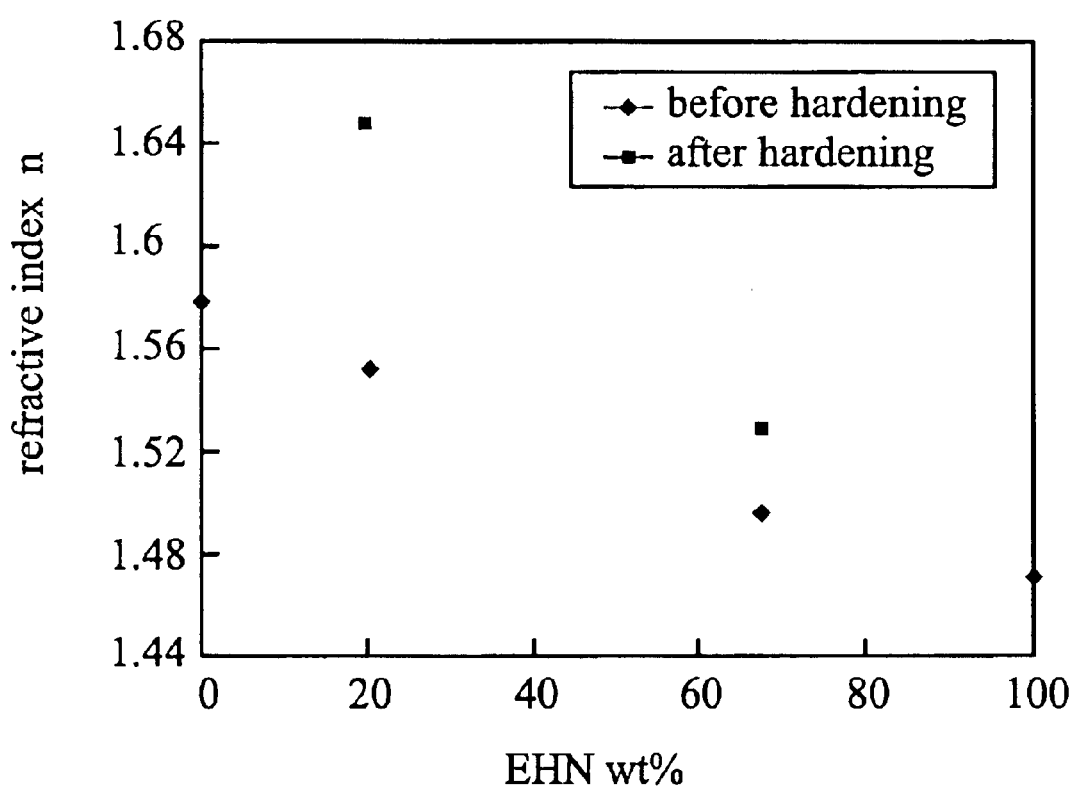
FIG. 6 shows the relationship between the refractive indices of f-mCOC before and after hardening.

When the cladding layer is made of mCOC with a refractive index of 1.5310 (at 632.8 nm), the core section material, f-mCOC, can be synthesized by altering the component ratios of its raw materials to meet the required refractive index. FIG. 5 shows the relationship between the refractive index of f-mCOC and the component proportion of EHN, and FIG. 6 shows the relationship between the refractive indices of f-mCOC before and after hardening. By integrating the above relationships, the component proportions of f-mCOC can be quickly chosen once the material of the cladding layer is decided, fulfilling the required optical properties and facilitating the design process.

According to the embodiments, due to the optical communication device is made up of various parts of essentially the same materials, (COCs), by systematically studying the refractive indices of COCs synthesized from different raw materials of various component ratios, the correlation therebetween is generalized, and a recipe system regarding the raw materials, their component ratios, and the refractive indices of the synthesized COCs is thus established, thereby facilitating mass production and fulfilling requirements of various specifications.

The foregoing description has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A cycloolefin copolymeric (COC) optical communication device, comprising:
   a core section of functional metallocene cycloolefin copolymer (f-mCOC) having a refractive index $n_1$ for light transmission; and
   a cladding layer of metallocene cycloolefin copolymer (mCOC), having a refractive index $n_2$ smaller than $n_1$, surrounding the core section, and forming a waveguide structure together with the core section.

2. The cycloolefin in copolymeric (COC) optical communication device as claimed in claim 1, wherein the functional metallocene cycloolefin copolymer is synthesized from ethylene, norbornene, and a third monomer having an active site catalyzed by a metallocene catalyst.

3. The cycloolefin copolymeric (COC) optical communication device as claimed in claim 2, wherein the third monomer having an active site is 4-methyl-styrene, 5-ethyl-2-norbornene or 5-ethylidene-norbornene.

4. The cycloolefin copolymeric (COC) optical communication device as claimed in claim 1, wherein the refractive index $n_2$ of the cladding layer is 1.5200–1.5400 while the refractive index $n_1$ of the core section is 1.5215–1.5631, depending on the requirement of a multi-mode device or a single-mode device.

5. The cycloolefin copolymeric (COC) optical communication device as claimed in claim 1, wherein the metallocene cycloolefin copolymer is synthesized from ethylene and norbornene catalyzed by a metallocene catalyst.

6. The cycloolefin copolymeric (COC) optical communication device as claimed in claim 1, wherein the cycloolefin copolymeric (COC) optical communication device is a multi-mode device, and the refractive-index difference between the core section and the cladding layer $\Delta n$ (=$n_1-n_2$) is 0.8%–1.5%.

7. The cycloolefin copolymeric (COC) optical communication device as claimed in claim 1, wherein the cycloolefin copolymeric (COC) optical communication device is a multi-mode device, and the refractive-index difference between the core section and the cladding layer $\Delta n$ (=$n_1-n_2$) is 1.0%–1.2%.

8. The cycloolefin copolymeric (COC) optical communication device as claimed in claim 1, wherein the cycloolefin copolymeric (COC) optical communication device is a single-mode device, and the refractive-index difference between the core section and the cladding layer $\Delta n$ (=$n_1-n_2$) is 0.1%–0.84%.

9. The cycloolefin copolymeric (COC) optical communication device as claimed in claim 1, wherein the cycloolefin copolymeric (COC) optical communication device is a single-mode device, and the refractive-index difference between the core section and the cladding layer $\Delta n$ (=$n_1-n_2$) is 0.3%–0.35%.

10. The cycloolefin copolymeric (COC) optical communication device as claimed in claim 1, wherein the refractive indices $n_1$ and $n_2$ are adjusted by altering the respective components of the core section and the cladding layer.

11. The cycloolefin copolymeric (COC) optical communication device as claimed in claim 1, further comprising a U-groove and a packaging mechanics.

12. The cycloolefin copolymeric (COC) optical communication device as claimed in claim 11, wherein the U-groove is for passive alignment.

13. The cycloolefin copolymeric (COC) optical communication device as claimed in claim 11, wherein the packaging mechanics is a micro lens or a micro lens array.

14. The cycloolefin copolymeric (COC) optical communication device as claimed in claim 1, wherein the transmission of the f-mCOC and mCOC to visible light is greater than 90%.

* * * * *